(12) United States Patent
Vojkovich

(10) Patent No.: US 7,796,191 B1
(45) Date of Patent: Sep. 14, 2010

(54) EDGE-PRESERVING VERTICAL INTERPOLATION

(75) Inventor: Mark M. Vojkovich, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1056 days.

(21) Appl. No.: 11/232,484

(22) Filed: Sep. 21, 2005

(51) Int. Cl.
*H04N 7/01* (2006.01)
*H04N 11/20* (2006.01)
*H04N 5/14* (2006.01)
*H04N 9/64* (2006.01)
*G06K 9/40* (2006.01)
*G06K 9/48* (2006.01)

(52) U.S. Cl. .................. 348/448; 348/452; 348/699; 348/701; 382/199; 382/266

(58) Field of Classification Search ............. 348/448, 348/452, 699, 701; 382/199, 266, 298, 300
See application file for complete search history.

(56) References Cited

U.S. PATENT DOCUMENTS

| | | | | |
|---|---|---|---|---|
| 5,353,119 | A * | 10/1994 | Dorricott et al. | 348/446 |
| 5,550,933 | A * | 8/1996 | Stetten | 382/199 |
| 5,943,099 | A | 8/1999 | Kim | |
| 6,133,957 | A * | 10/2000 | Campbell | 348/458 |
| 6,181,382 | B1 | 1/2001 | Kieu et al. | |
| 6,459,455 | B1 | 10/2002 | Jiang et al. | |
| 6,466,700 | B1 * | 10/2002 | Makram-Ebeid | 382/265 |
| 6,489,998 | B1 * | 12/2002 | Thompson et al. | 348/452 |
| 6,614,484 | B1 * | 9/2003 | Lim et al. | 348/448 |
| 6,757,022 | B2 * | 6/2004 | Wredenhagen et al. | 348/452 |
| 6,798,927 | B2 * | 9/2004 | Kosugi et al. | 382/299 |
| 7,012,649 | B2 | 3/2006 | Michel | |
| 7,023,487 | B1 * | 4/2006 | Adams | 348/448 |
| 7,075,580 | B2 * | 7/2006 | Jiang | 348/448 |
| 7,154,556 | B1 * | 12/2006 | Wang et al. | 348/452 |
| 7,161,602 | B2 * | 1/2007 | Shan | 345/606 |
| 7,265,791 | B2 | 9/2007 | Song et al. | |
| 7,277,581 | B1 * | 10/2007 | Lightstone et al. | 382/181 |
| 7,292,738 | B1 * | 11/2007 | Ma et al. | 382/300 |
| 7,354,708 | B2 * | 4/2008 | Hall et al. | 435/6 |

(Continued)

OTHER PUBLICATIONS

Advisory Action, U.S. Appl. No. 11/222,893 dtd. Feb. 23, 2010.

(Continued)

*Primary Examiner*—Brian P Yenke
(74) *Attorney, Agent, or Firm*—Patterson & Sheridan, LLP

(57) ABSTRACT

One embodiment of an edge-preserving vertical interpolation system constructs a de-interlaced video frame on a pixel-by-pixel basis using an edge-preserving vertical interpolation technique. Pixels within a pixel window centered about a selected pixel determine the direction of an intensity gradient associated with the selected pixel. A first pixel is constructed by interpolating between pixels that are perpendicular to the direction of the intensity gradient and a confidence factor is computed that indicates the likelihood that there is only one edge within the pixel window. A second pixel is constructed using a non-edge-preserving vertical interpolation technique. Interpolating between the first pixel and the second pixel based on the confidence factor generates a pixel in the de-interlaced video frame corresponding to the selected pixel. Unlike prior art techniques, the present invention does not attempt to correlate between pixel features and is therefore more robust to noisy pixel data than prior art techniques.

17 Claims, 10 Drawing Sheets

U.S. PATENT DOCUMENTS

| | | | |
|---|---|---|---|
| 7,372,471 B1 * | 5/2008 | Hutchins | 345/611 |
| 7,379,626 B2 * | 5/2008 | Lachine et al. | 382/300 |
| 7,403,234 B2 * | 7/2008 | Lertrattanapanich et al. | 348/448 |
| 7,515,204 B1 * | 4/2009 | He et al. | 348/448 |
| 2002/0108521 A1 * | 8/2002 | Velde et al. | 101/483 |
| 2003/0095205 A1 * | 5/2003 | Orlick et al. | 348/448 |
| 2004/0246374 A1 | 12/2004 | Mishima et al. | |
| 2006/0098877 A1 * | 5/2006 | Barnes et al. | 382/203 |
| 2006/0244861 A1 * | 11/2006 | Lertrattanapanich et al. | 348/448 |
| 2007/0052845 A1 * | 3/2007 | Adams | 348/452 |
| 2008/0056617 A1 * | 3/2008 | Wei et al. | 382/300 |

OTHER PUBLICATIONS

Office Action, U.S. Appl. No. 11/222,893, dated Jun. 3, 2009.

* cited by examiner

5x3 Pixel window
202

| Pixel 210 | Pixel 212 | Pixel 214 | Pixel 216 | Pixel 218 | Line n 203 |
|---|---|---|---|---|---|
| | | Pixel 201 | | | |
| Pixel 220 | Pixel 222 | Pixel 224 | Pixel 226 | Pixel 228 | Line n+1 204 |

Figure 2A

Horizontal operator
206

| HO 250 | HO 252 | | HO 256 | HO 258 |
|---|---|---|---|---|
| | | | | |
| HO 260 | HO 262 | | HO 266 | HO 268 |

Figure 2B

Horizontal gradient
calculation array
208

| R 270 | R 272 |  | R 276 | R 278 |
|---|---|---|---|---|
|  |  |  |  |  |
| R 280 | R 282 |  | R 286 | R 288 |

Typical result R 270 = HO 250 * Pixel 210
Horizontal gradient = sum of all results

Figure 2C

Vertical operator
306

| VO 350 | VO 352 | VO 354 | VO 356 | VO 358 |
|---|---|---|---|---|
|  |  |  |  |  |
| VO 360 | VO 362 | VO 364 | VO 366 | VO 368 |

Figure 3A

Vertical gradient
calculation array
308

| S 370 | S 372 | S 374 | S 376 | S 378 |
|---|---|---|---|---|
|  |  |  |  |  |
| S 380 | S 382 | S 384 | S 386 | S 388 |

Typical result S 370 = VO 350 * Pixel 210
Vertical gradient vector = sum of all results

Figure 3B

Local horizontal intensity
gradient array
420

| HG 430 | HG 432 | HG 436 | HG 438 |
|---|---|---|---|
| HG 440 | HG 442 | HG 446 | HG 448 |

Typical local horizontal gradient (HG)
430 = Pixel 212 – Pixel 210

Figure 4B

Local vertical intensity
gradient array
460

|  |  |  |  |  |
|---|---|---|---|---|
| VG 470 | VG 472 | VG 474 | VG 476 | VG 478 |
|  |  |  |  |  |

Typical local vertical gradient (VG)
470 = Pixel 220 – Pixel 210

Figure 4C

EDGE-PRESERVING VERTICAL INTERPOLATION

BACKGROUND OF THE INVENTION

1. Field of the Invention

Embodiments of the present invention relate generally to video processing and more specifically to edge-preserving vertical interpolation.

2. Description of the Related Art

Video frames are typically encoded in an interlaced format comprising a first field and a second field, each field having alternating lines of the video frame and each field being temporally separated. Video images are typically encoded and transmitted in such an interlaced format as a compromise between bandwidth and video image resolution. Since interlaced video frames are displayed using only half the lines of a full video frame, less system bandwidth is required to process and display these types of video frames. However, since the human eye typically cannot resolve a single video field, but rather, blends the first field and the second field, the perceived image has the vertical resolution of both fields combined.

Some types of video displays, such as progressive displays, require the use of de-interlaced video frames instead of interlaced video frames. For such displays, the video frames encoded in an interlaced format must be de-interlaced prior to display. There are several well-known methods to construct de-interlaced video frames. One such method is commonly referred to as the "bob" method in which a de-interlaced video frame is constructed from a single video field that is vertically interpolated. One drawback of this method is that objects within a scene that have diagonal or round edges are often incorrectly interpolated. This is due to the fact that vertical interpolation generally does not try to preserve edge information, but rather simply interpolates between a line above and a line below the missing line in the video frame. The resulting interpolated diagonal edges or round objects appear as stair steps, as opposed to smooth edges, and, thus, tend to decrease picture quality.

Several well-known techniques attempt correct this drawback in the bob method by trying to preserve edge information. One such approach attempts to determine the edge of an object by correlating video data within a 3×3 pixel window (other versions of this approach may use other sized pixel windows, such as a 5×3 or 7×3 pixel window). Specifically, pixel data from the top line of the window is correlated with pixel data from the bottom line in order to determine a horizontal shift between the top and bottom lines. The horizontal shift is assumed to coincide with the edge. Upon determining the edge of an object within the pixel window, pixels for the missing field may be constructed by interpolating along the determined edge. This approach, however, is relatively sensitive to "noisy" video data that has relatively greater amounts of intensity transitions due to either picture content or encoding errors. As is well-known, a video field with noisy data may produce false edges that, in turn, cause erroneous interpolated pixels to be produced. Further, this approach often fails to find edges when there are no obvious correlations among the pixels within the pixel window.

As the foregoing illustrates, what is needed in the art is a vertical interpolation technique that better accounts for edge information, thereby, increasing overall picture quality.

SUMMARY OF THE INVENTION

One embodiment of the invention sets forth a method for generating pixels for a de-interlaced video frame. The method includes the steps of selecting a pixel in the de-interlaced video frame, determining that a first pixel corresponding to the selected pixel is not present in a video field and determining an edge direction associated with the first pixel. The method also includes the steps of constructing the first pixel based on values of one or more pixels that reside along the edge direction, and computing a confidence factor associated with the first pixel.

One advantage of the disclosed technique is that it results in more reliable edge detection relative to prior art edge-detection techniques because the disclosed technique does not attempt to correlate pixel features to determine an edge in a video field. Rather, the disclosed technique analyzes intensity data for all of the pixels in a pixel window at once when computing the intensity gradient vector for the pixel window to determine the edge direction. Since the intensity gradient vector computations are less sensitive to noisy pixel data than pixel feature correlations, the disclosed technique is more robust in the face of noisy pixel data than prior art edge-detection techniques. In addition, the disclosed technique is further desensitized to noisy video data because the confidence factor limits the use of pixel data interpolated along the computed edge direction when the algorithm shows that the likelihood of having only one edge in the pixel window is low, which is a result that may occur with excessively noisy pixel data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A is a conceptual diagram illustrating a 5×3 pixel window, according to one embodiment of the invention;

FIGS. 2B-2C are conceptual diagrams illustrating how the edge-preserving vertical interpolator of FIG. 1 computes a horizontal intensity gradient for the pixel window, according to one embodiment of the invention;

FIGS. 3A-3B are conceptual diagrams illustrating how the edge-preserving vertical interpolator of FIG. 1 computes a vertical intensity gradient for the pixel window, according to one embodiment of the invention;

FIG. 4B is a conceptual diagram of a local horizontal intensity gradient array, according to one embodiment of the invention;

FIG. 4C is a conceptual diagram of a local vertical intensity gradient array, according to one embodiment of the invention;

DETAILED DESCRIPTION

Figure 1:
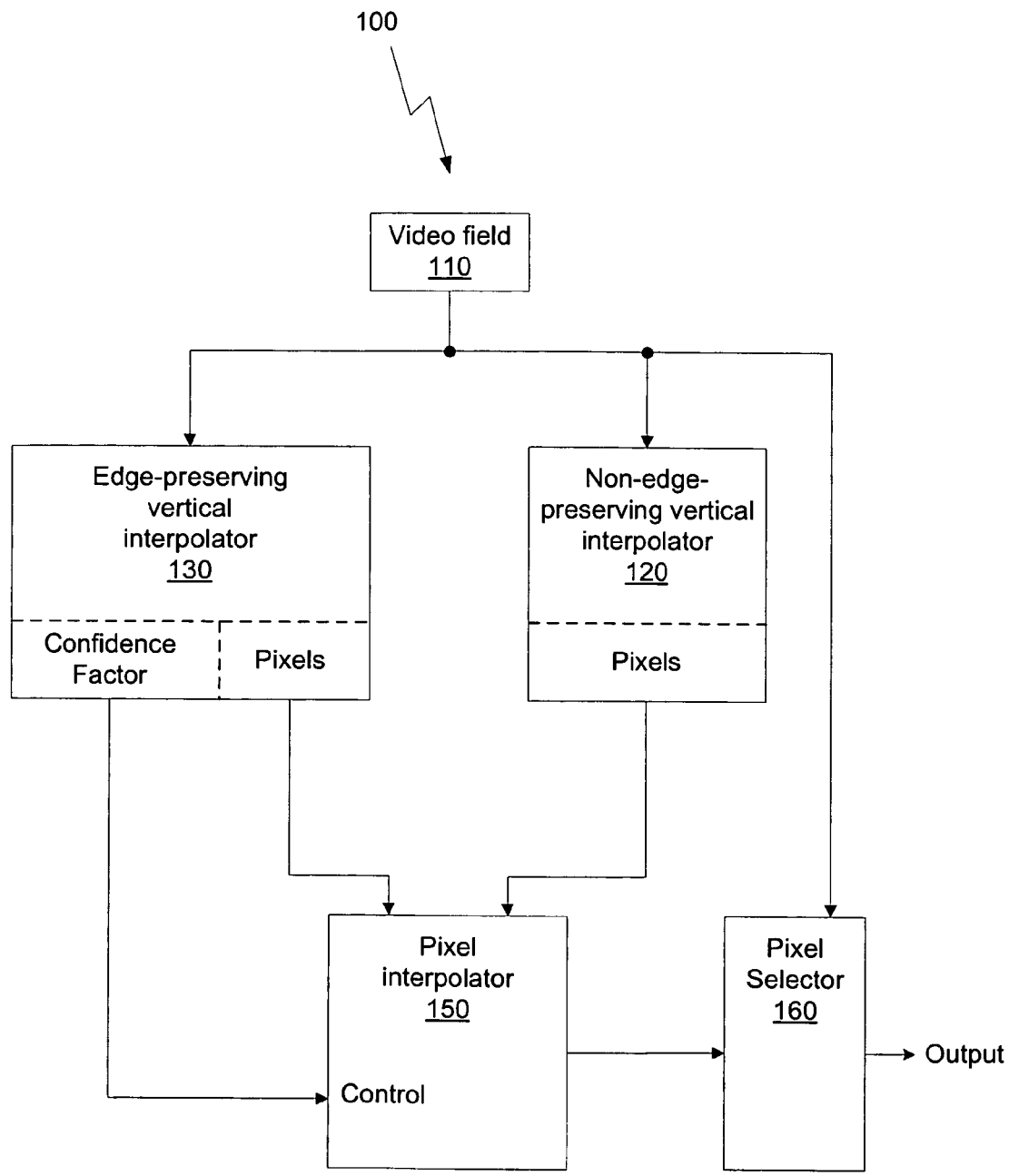
FIG. 1 is a conceptual diagram of an edge-preserving vertical interpolation system, according to one embodiment of the invention.

FIG. 1 is a conceptual diagram of an edge-preserving vertical interpolation system 100, according to one embodiment of the invention. The edge-preserving vertical interpolation system 100 includes, without limitation, a non-edge-preserving vertical interpolator 120, an edge-preserving vertical interpolator 130, a pixel interpolator 150 and a pixel selector 160. The edge-preserving vertical interpolation system 100 produces a de-interlaced video frame (hereinafter referred to as a "final de-interlaced video frame") based on a video field 110.

The non-edge-preserving vertical interpolator 120 receives the video field 110 and vertically interpolates the pixels of the missing lines of the de-interlaced video frame corresponding to the video field 110. Vertical interpolation may be performed using a standard bob technique (previously described herein) or any other technically feasible technique. The pixels of the missing lines produced by the non-edge-preserving vertical interpolator 120 are transmitted to the pixel interpolator 150.

The edge-preserving vertical interpolator 130 also receives the video field 110. In contrast to the standard bob technique employed by the non-edge-preserving vertical interpolator 120, the edge-preserving vertical interpolator 130 determines the pixels of the missing lines of the de-interlaced video frame corresponding to the video field 110 by first calculating horizontal and vertical intensity gradients for a pixel window centered on the missing pixel. Using the horizontal and vertical intensity gradients, an overall intensity gradient vector is then generated for the pixel window. The edge of an object falling within the pixel window is defined to be perpendicular to the overall intensity gradient vector. The edge-preserving vertical interpolator 130 then determines the missing pixel by interpolating between existing pixels along the edge, as opposed to interpolating between existing vertical pixels (as the non-edge-preserving vertical interpolator 120 does). Again, the pixels of the missing lines produced by the edge-preserving vertical interpolator 130 are transmitted to the pixel interpolator 150.

The computation of the horizontal intensity gradient, which indicates the magnitude of the horizontal intensity gradient associated with a missing pixel, is described in greater detail below in conjunction with FIGS. 2B-2C. The computation of the vertical intensity gradient, which indicates the magnitude of the vertical intensity gradient associated with a missing pixel, is described in greater detail below in conjunction with FIGS. 3A-3B. The edge-preserving vertical interpolator 130 also produces a confidence factor associated with each interpolated pixel that indicates the certainty that there is only one edge in the pixel window. The computation of the confidence factor is described in greater detail below in conjunction with FIGS. 4A-4C. The overall operation of the edge-preserving vertical interpolator 130 is described in greater detail below in conjunction with FIG. 5.

The pixel interpolator 150 receives the pixels produced by the non-edge-preserving vertical interpolator 120 and the pixels and the confidence factor produced by the edge-preserving vertical interpolator 130. The pixel interpolator 150 generates pixels by linearly interpolating between a pixel produced by the non-edge preserving vertical interpolator 120 and a corresponding pixel produced by the edge-preserving vertical interpolator 130. The linear interpolation is guided by the confidence factor. The pixel selector 160 generates pixels for the final de-interlaced video frame on a pixel-by-pixel basis by selecting either a pixel from the pixel interpolator 150 or a pixel from the video field 110. The operation of the pixel interpolator 150 and the pixel selector 160 is described in greater detail below in conjunction with FIG. 7.

FIG. 2A is a conceptual diagram illustrating a pixel window 202, according to one embodiment of the invention. The size of the pixel window 202 is five pixels by three pixels (5×3). In alternative embodiments, the pixel window may be other sizes, such as seven pixels by five pixels (7×5). As shown, the pixel window 202 includes a first line 203 and a second line 204 from the video field 110. The first line 203 is denoted as line n and includes pixels 210, 212, 214, 216 and 218. The second line 204, denoted as line n+1, is the line subsequent to the first line 203 in the video field 110 and includes pixels 220, 222, 224, 226 and 228. The pixels 210, 212, 214, 216, 218, 220, 222, 224, 226 and 228 within the pixel window contain color and intensity (e.g., luminance) information. In one embodiment, the pixel intensity information is normalized and represented by a floating point number between 0.0 and 1.0, where 0.0 is the minimum intensity and 1.0 is the maximum intensity. The pixel window 202 is centered on a pixel 201, which is an unknown pixel (because pixel 201 is not in either the first line 203 or the second line 204) whose value is to be determined by the edge-preserving vertical interpolator 130.

FIGS. 2B-2C are conceptual diagrams illustrating how the edge-preserving vertical interpolator 130 computes a horizontal intensity gradient of the pixel window 202. As described in these figures, the horizontal intensity gradient is calculated by summing pixel intensities that have been weighted by a horizontal operator. FIGS. 3A-3B are conceptual diagrams illustrating how the edge-preserving vertical interpolator 130 computes a vertical intensity gradient for the pixel window 202. Similar to the horizontal intensity gradient, the vertical intensity gradient is calculated by summing pixel intensities that have been weighted by a vertical operator. As described in FIGS. 5 and 6, the edge-preserving vertical interpolator 130 then computes an overall intensity gradient vector for the pixel window 202 based on the horizontal and vertical intensity gradients and determines an edge direction within the pixel window 202 based on the overall intensity gradient vector. Once the edge direction is known, the unknown pixel 201 may be constructed by the edge-preserving vertical interpolator 130 by interpolating between existing pixels within the pixel window 202 that lie along the edge.

In one embodiment, a driver, such as a software program or application, performs the necessary computations for determining the horizontal and vertical intensity gradient vectors. In alternative embodiments, the computations may be performed by dedicated hardware such as a graphics processor.

FIG. 2B is a conceptual diagram illustrating the horizontal operator 206, according to one embodiment of the invention. As is well-known, an operator is a means of describing the relative importance or weight of multiple objects. Two-dimensional operators, such as the horizontal operator are typically expressed in matrix form. The horizontal operator 206 reflects the relative importance of the pixel intensities within the pixel window 202 in the calculation of the horizontal intensity gradient. Oftentimes, the intensities located closer to the pixel being interpolated (i.e., pixel 201) are given greater weightings since those intensities are more relevant to the question of whether there is an edge direction in close proximity to the pixel being interpolated. As shown, elements of the horizontal operator 206 are denoted as "HO." In one embodiment, the values of the elements of the horizontal operator 206 are HO 250=−1, HO 252=−1.5, HO 256=1.5, HO 258=1, HO 260=−1, HO 262=−1.5, HO 266=1.5 and HO 268=1. Note that the elements of the horizontal operator 206 having a value of zero are shown without values. In alternative embodiments, the elements of the horizontal operator 206 may include other values.

FIG. 2C is a conceptual diagram illustrating a horizontal intensity gradient calculation array 208, according to one embodiment of the invention. The driver multiplies the non-zero elements of the horizontal operator 206 with the corresponding pixel intensities of the pixel window 202 to construct eight products, where each such product is reflected as an element of the horizontal intensity gradient calculation array 208. Thus, R 270=(HO 250*Pixel 210), R 272=(HO 252*Pixel 212), R 276=(HO 256*Pixel 216), R 278=(HO 258*Pixel 218), R 280=(HO 260*Pixel 220), R282=(HO 262*Pixel 222), R 286=(HO 266*Pixel 226) and R 288=(HO 268*Pixel 228). All other elements of the horizontal intensity gradient calculation array 208 are zero and therefore are shown without values. The horizontal intensity gradient for the pixel window 202 is then calculated by summing together all eight of the non-zero elements in the horizontal intensity gradient calculation array 208 (i.e., R 270+R 272+R 276+R 278+R 280+R 282+R 286+R 288).

FIG. 3A is a conceptual diagram illustrating the vertical operator 306, according to one embodiment of the invention. Similar to the horizontal operator 206, the vertical operator 306 reflects the relative importance of the pixel intensities within the pixel window 202 in the calculation of the vertical intensity gradient. Again, the intensities located closer to the pixel being interpolated (i.e., pixel 201) may be given greater weightings since those intensities are more relevant to the question of whether there is an edge direction in close proximity to the pixel being interpolated. As shown, elements of the vertical operator 306 are denoted as "VO." In one embodiment, the values of the elements of the vertical operator 306 are VO 350=−1, VO 352=−1, VO 354 =−1, VO 356=−1, VO 358=−1, VO 360=1, VO 362=1, VO 364=1, VO 366=1 and VO 368=1. Note that the elements of the vertical operator 306 having a value of zero are shown without values. In alternative embodiments, the elements of the vertical operator 306 may include other values FIG. 3B is a conceptual diagram illustrating a vertical intensity gradient calculation array 308, according to one embodiment of the invention. The driver multiplies the non-zero elements of the vertical operator 306 with corresponding pixel intensities of the pixel to construct ten products, where each such product is reflected as an element of the vertical intensity gradient calculation array 308. Thus, S 370=(VO 350*Pixel 210), S 372=(VO 352*Pixel 212), S 374=(VO 354*Pixel 214), S 376=(VO 356*Pixel 216), S 378=(VO 358*Pixel 218), S 380=(VO 360*Pixel 220), S 382=(VO 362*Pixel 222), S 384=(VO 364*Pixel 224), S 386=(VO 366*Pixel 226) and S 388=(VO 368*Pixel 228). All other elements of the vertical intensity gradient calculation array 308 are zero and are therefore shown without values. The vertical intensity gradient for the pixel window 202 is calculated by summing together of all ten of the non-zero elements in the vertical intensity gradient calculation array 308 (i.e., S 370+S 372+S 374+S 376+S 378+S 380+S 382+S 384+S 386+S 388).

Figure 4A:
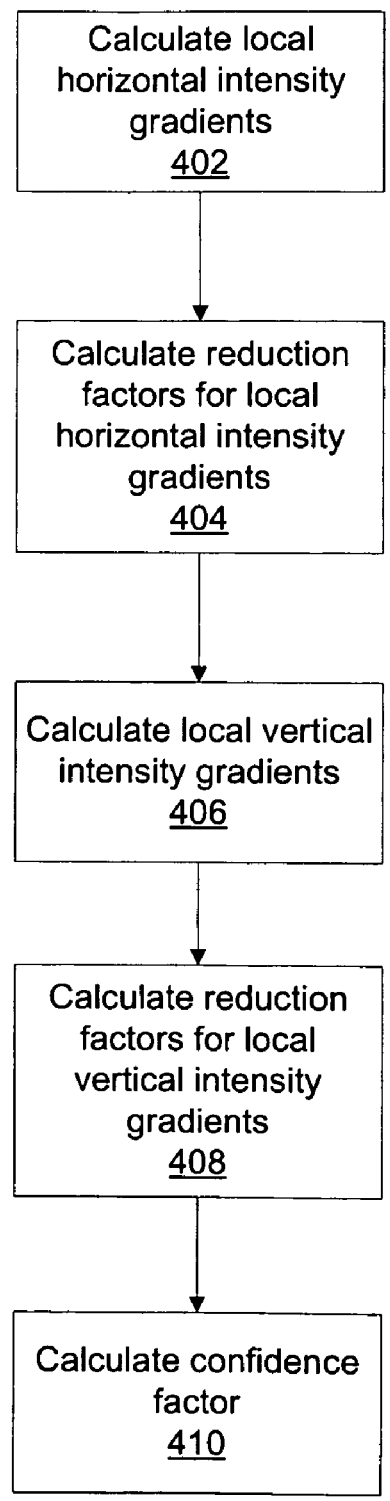
FIG. 4A is a flow diagram of method steps delineating how the edge-preserving vertical interpolator of FIG. 1 computes a confidence factor, according to one embodiment of the invention.

FIG. 4A is a flow diagram of method steps delineating how the edge-preserving vertical interpolator 130 computes a confidence factor, according to one embodiment of the invention. Persons skilled in the art will recognize that any system configured to perform the method steps in any order is within the scope of the invention.

As described herein, the edge-preserving vertical interpolator 130 determines the direction of an edge within a pixel window and then interpolates between pixels within the pixel window in the direction of the edge to determine the value of a missing pixel (e.g., pixel 201 of FIG. 2A). If, however, there are multiple edges detected within the pixel window, then the value of the missing pixel may be interpolated inaccurately. In order to quantify the accuracy of the interpolated pixel, the edge-preserving vertical interpolator 130 also constructs a confidence factor that indicates the probability that only one edge resides within the pixel window. The confidence factor is then used by the pixel interpolator 150 of FIG. 1 to generate pixels for a de-interlaced video frame. This process is described in greater detail below in conjunction with FIG. 7.

The method for determining the confidence factor begins in step 402, where the edge-preserving vertical interpolator 130 calculates local horizontal intensity gradients. A local horizontal intensity gradient is simply the difference in pixel intensities between two horizontally adjacent pixels. The local horizontal intensity gradients for the pixel window 202 are shown in FIG. 4B in a local horizontal intensity gradient array 420 and are denoted with "HG." In one embodiment, HG 430=(Pixel 212−Pixel 210), HG 432=(Pixel 214−Pixel 212), HG 436=(Pixel 216−Pixel 214), HG 438=(Pixel 218−Pixel 216), HG 440=(Pixel 222−Pixel 220), HG 442=(Pixel 224−Pixel 222), HG 446=(Pixel 226−Pixel 224) and HG 448=(Pixel 228−Pixel 226). In one embodiment, the local horizontal intensity gradients have values between −1.0 and 1.0. As persons skilled in the art will recognize, if the local horizontal intensity gradients change sign within a row of the local horizontal intensity gradient array 420, then there is an increased likelihood that more than one edge direction exists within the pixel window 202.

In step 404, the edge-preserving vertical interpolator 130 calculates horizontal reduction factors. The edge-preserving vertical interpolator 130 constructs one horizontal reduction factor from two local horizontal intensity gradients. For example, in one embodiment, six horizontal reduction factors are constructed from the eight local horizontal intensity gradients (HG 430, HG 432, HG 436, HG 438, HG 440, HG 442, HG 446 and HG 448) of FIG. 4B. In other embodiments, fewer or more than six horizontal reduction factors may be constructed. In addition, the number of calculated horizontal reduction factors is a tunable performance parameter. Calculating more horizontal reduction factors increases the number of comparisons between the local horizontal intensity gradients in the pixel window used to compute the confidence factor, thereby making the confidence factor more reliable. However, more horizontal reduction factor calculations increases overall processing time, thereby reducing overall processing efficiency.

In one embodiment, the function to compute horizontal reduction factors (hrf) may be expressed as follows:

$$hrf(HG0,HG1)=\text{clamp}(((HG0*HG1)+(\text{limit}))*1/\text{limit})$$

where HG0 and HG1 are local horizontal intensity gradients, the limit is set to 1/64 and the clamp function "limits" the results to numbers between zero and one. The limit value is a tunable parameter that determines how much deviation between local horizontal intensity gradients is tolerated before the horizontal reduction factor goes to zero. The six horizontal reduction factors are computed as follows: hrf0 (HG 432, HG 436), hrf1(HG 430, HG 436), hrf2(HG 432, HG 438), hrf3(HG 442, HG 446), hrf4(HG 440, HG 446) and hrf5(HG 442, HG 448).

In step 406, the edge-preserving vertical interpolator 130 calculates local vertical intensity gradients. A local vertical intensity gradient is simply the difference in pixel intensities between two vertically adjacent pixels. The local vertical intensity gradients for the pixel window 202 are shown in FIG. 4C in a local vertical intensity gradient array 460 and are denoted with "VG." In one embodiment, VG 470=(Pixel 220–Pixel 210), VG 472=(Pixel 222–Pixel 212), VG 474= (Pixel 224–Pixel 214), VG 476=(Pixel 226–Pixel 216) and VG 478=(Pixel 228–Pixel 218). In one embodiment, the local vertical intensity gradients have values between −1.0 and 1.0. Again, as persons skilled in the art will recognize, if the local vertical intensity gradients change sign within a row of the local vertical intensity gradient array 460, then there is an increased likelihood that more than one edge direction exists within the pixel window 202.

In step 408, the edge-preserving vertical interpolator 130 calculates vertical reduction factors. The edge-preserving vertical interpolator 130 constructs one vertical reduction factor from two local vertical intensity gradients. For example, in one embodiment, two vertical reduction factors are constructed from five local vertical intensity gradients (VG 470, VG 472, VG 474, VG 476 and VG 478) of FIG. 4C. Again, fewer or more than two vertical reduction factors may be constructed in other embodiments. The number of calculated vertical reduction factors is a tunable performance parameter. Calculating more vertical reduction factors increase the number of comparisons between the local vertical intensity gradients in the pixel window used to compute the confidence factor, thereby making the confidence factor more reliable. However, more vertical reduction factor calculations increase the overall processing time, reducing overall processing efficiency.

In one embodiment, the function to compute vertical reduction factors (vrf) may be expressed as follows:

$$\text{vrf}(VG0, VG1) = \text{clamp}((VG0 * VG1 + (\text{limit})) * 1/\text{limit})$$

where VG0 and VG1 are local vertical intensity gradient vectors, the limit is set to 64 and the clamp function "limits" the results to numbers between zero and one. Again, the limit value is a tunable parameter that determines how much deviation between local vertical intensity gradient vectors is tolerated before the reduction factor goes to zero. The two vertical reduction factors are computed as follows: vrf0(VG 472, VG 474) and vrf1(VG 474, VG 476).

In alternative embodiments, when computing the vertical reduction factors, the limit may be set to a larger number than when computing the horizontal reduction factors, thereby effectively allowing relatively more vertical intensity gradient deviation than horizontal intensity gradient deviation. Likewise, when computing the horizontal reduction factors, the limit may be set to a larger number than when computing the vertical reduction factors to allow relatively more horizontal intensity gradient deviation than vertical intensity gradient deviation.

In step 410, the confidence factor is calculated. The confidence factor is simply the product of all the reduction factors. In this case, the confidence factor may be computed as follows:

confidence factor=hrf0*hrf1*hrf2*hrf3*hrf4*hrf5*vrf0*vrf1.

Since the horizontal and vertical reduction factors all range between zero and one, the confidence factor ranges between zero and one.

Figure 5:
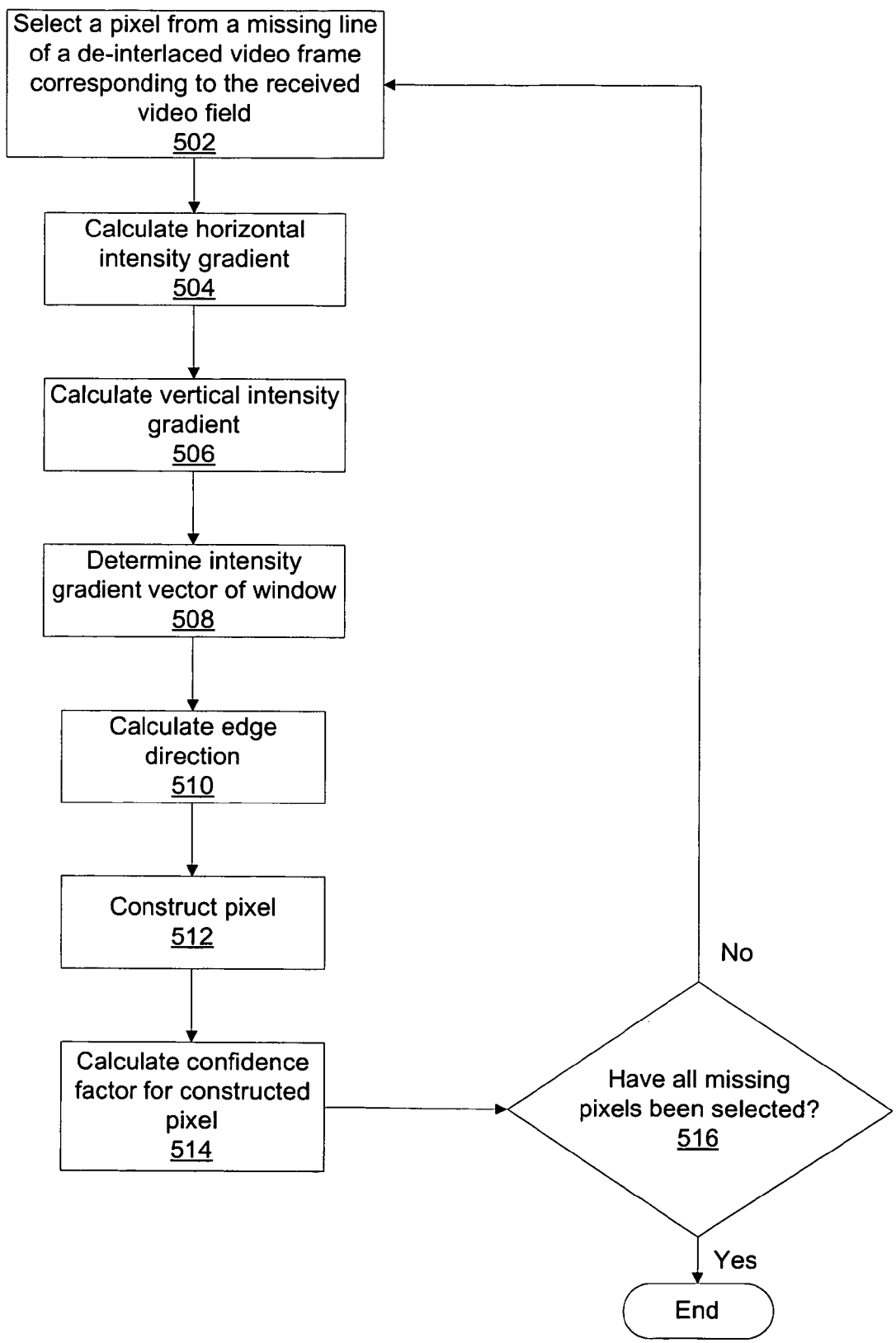
FIG. 5 is a flow diagram of method steps for determining the output of the edge-preserving vertical interpolator of FIG. 1, according to one embodiment of the invention.

FIG. 5 is a flow diagram of method steps for determining the output of the edge-preserving vertical interpolator 130 of FIG. 1, according to one embodiment of the invention. Persons skilled in the art will recognize that any system configured to perform the method steps in any order is within the scope of the invention.

The edge-preserving vertical interpolator 130 interpolates missing lines of a de-interlaced video frame based upon a video field 110 on a pixel-by-pixel basis. A video field 110 contains only one half of the necessary video lines to construct a de-interlaced video frame; the other half of the video lines are often referred to as "missing lines." As described herein, the edge-preserving vertical interpolator 130 generates pixels of the missing lines by constructing a pixel from one or more pixels that exist along an edge in the video field 110.

The method begins in step 502, where the edge-preserving vertical interpolator 130 selects a pixel in a missing line of the video field 110. In step 504, the edge-preserving vertical interpolator 130 calculates the horizontal intensity gradient associated with the selected pixel. As described herein, the horizontal intensity gradient is determined by applying a horizontal operator to the intensities of the pixels within a pixel window centered on the selected pixel. In step 506, the edge-preserving vertical interpolator 130 calculates the vertical intensity gradient vector associated with the selected pixel. Again, the vertical intensity gradient vector is determined by applying a vertical operator to the pixel intensities of pixels within a pixel window centered on the selected pixel. In step 508, the horizontal intensity gradient and the vertical intensity gradient are combined to create an overall intensity gradient vector for the pixel window. In step 510, the edge-preserving vertical interpolator 130 calculates the direction of an edge within the pixel window based on the intensity gradient vector of the pixel window. Although the intensity gradient vector includes both a magnitude and a direction, only the direction parameter of the vector is used. As is well-known, the edge of an object is typically perpendicular to the direction of an intensity gradient vector. The edge-preserving vertical interpolator 130, therefore, calculates the edge direction to be perpendicular to the direction of the intensity gradient vector.

In step 512, the edge-preserving vertical interpolator 130 constructs the selected pixel by interpolating the values of existing pixels within the pixel window that lie along the computed edge. The interpolation process is described in greater detail below in conjunction with FIG. 6. In step 514, the confidence factor for the constructed pixel is computed. As previously described herein, the confidence factor is calculated by multiplying together the reduction factors computed from the local horizontal and vertical intensity gradients associated with the pixel window centered on the selected pixel. Again, in one embodiment, the confidence factor ranges between zero and one. In step 516, the edge-preserving vertical interpolator 130 determines if all the missing pixels in the missing lines of the video field 110 have been selected. If all the missing pixels have not been selected, then the method returns to step 502. If, on the other hand, all the missing pixels have been selected, then the method terminates.

Again, the pixels generated by the edge-preserving vertical interpolator 130 using the method of FIG. 5 comprise the missing pixels of the video field 110. When the generated pixels are later combined with the existing pixels of the video field 110, a de-interlaced video frame is formed. As shown in FIG. 1, the pixels generated by the edge-preserving vertical interpolator 130, as well as the confidence factors corresponding to the generated pixels, are transmitted to the pixel interpolator 150 for further processing (described below in FIG. 7).

Figure 6:
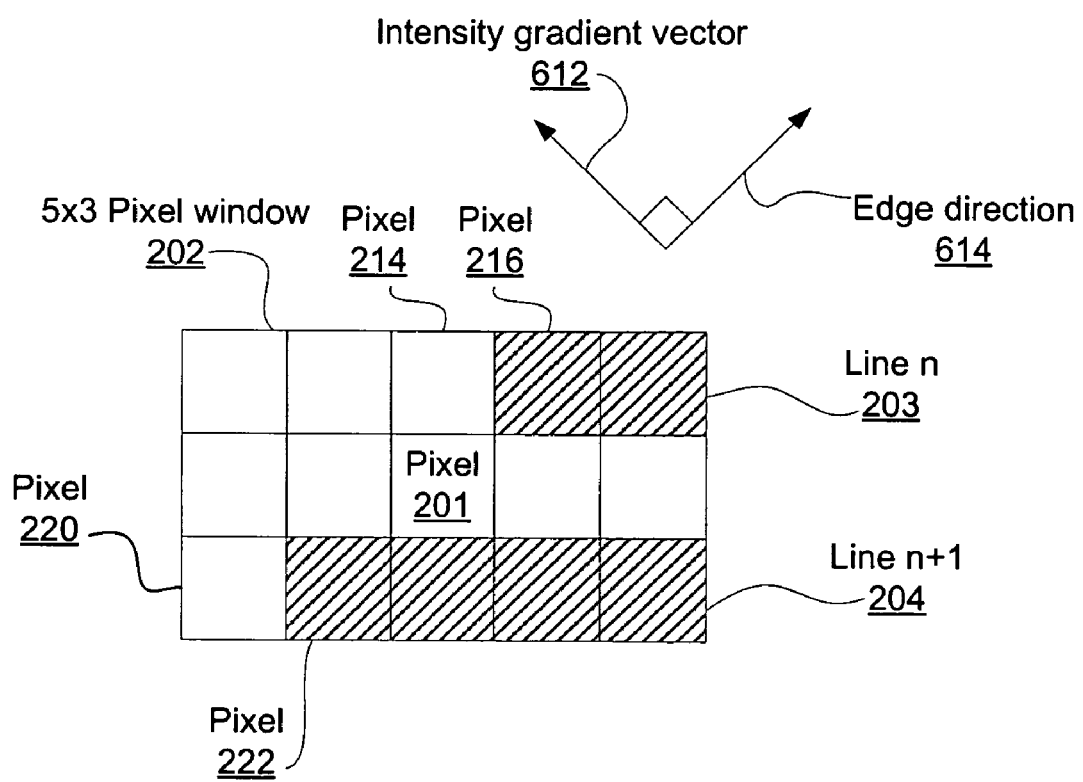
FIG. 6 is a conceptual diagram illustrating an intensity gradient vector associated with the pixel window of FIG. 2A, according to one embodiment of the invention.

FIG. 6 is a conceptual diagram illustrating an intensity gradient vector 612 associated with the pixel window 202 of FIG. 2A, according to one embodiment of the invention. Again, the pixel window 202 includes lines 203 and 204 from the video field 110 and the pixel 201, which is an example of a pixel that may be constructed by the edge-preserving vertical interpolator 130 using the method of FIG. 5. Note that the pixels having relatively lower intensities, such as pixel 216 and pixel 222, are shown as filled boxes.

When pixel 201 is constructed, the horizontal and vertical intensity gradients for the pixel window 202 are first computed followed by the overall intensity gradient vector 612 for the pixel window 202 (steps 504, 506 and 508). The edge-preserving vertical interpolator 130 then computes an edge direction 614, which is perpendicular to the direction of the intensity gradient vector 612 (step 510). Next, the value for pixel 201 is computed by interpolating between the values of pixels from the first line 203 and the second line 204 that lie along the edge direction 614 proximate to pixel 201 (step 512). As shown, since pixel 216 from the first line 203 and pixel 222 from the second line 204 lie along the edge direction 614, the value of pixel 201 is determined by linearly interpolating between the values of pixel 216 and pixel 222.

In the case where the centers of the pixels within the pixel window 202 do not lie along the edge direction 614, the pixel value from the first line 203 and the pixel value from the second line 204 used to determine the value of pixel 201 also are interpolated to account for the fact that no pixels from the first line 203 or the second line 204 lie directly along the edge direction 614. For example, if the edge direction 614 were to intersect pixel 214 and pixel 216 of line 203 (assuming that the edge direction 614 is not horizontal), then the value for the pixel from the first line 203 used to determine the value of pixel 201 would be determined by interpolating between the values of pixel 214 and pixel 216. In a similar manner, if the edge direction 614 were to intersect pixel 220 and pixel 222 of the second line 204 (again assuming that the edge direction 614 is not horizontal), then the value for the pixel from the second line 204 used to determine the value of pixel 201 would be determined by interpolating between the values of pixel 220 and pixel 222.

The edge-preserving vertical interpolator 130 then uses local horizontal and vertical intensity gradient information to calculate the confidence factor for pixel 201 (step 522). As previously described herein, the confidence factor indicates the accuracy of the constructed pixel 201. The more reliable the determined edge is, the closer the confidence factor is to one. Conversely, if the determined edge is unreliable (e.g., in the case where there are multiple edges or noisy video data within the pixel window 202) the closer the confidence factor is to zero.

Figure 7:
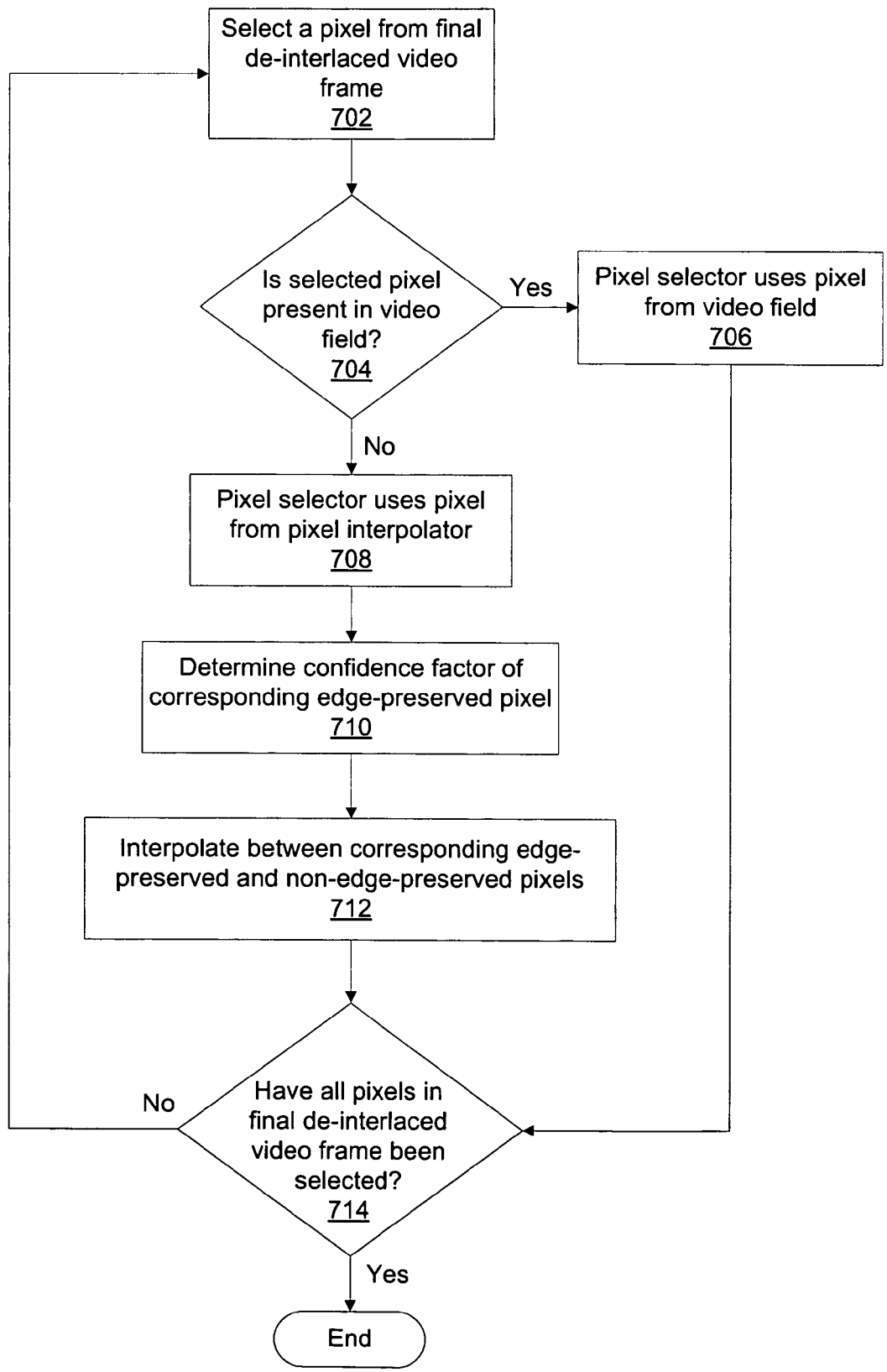
FIG. 7 is a flow diagram of method steps for determining the output of the edge-preserving vertical interpolation system of FIG. 1, according to one embodiment of the invention.

FIG. 7 is a flow diagram of method steps for determining the output of the edge-preserving vertical interpolation system 100 of FIG. 1, according to one embodiment of the invention. Persons skilled in the art will recognize that any system configured to perform the method steps in any order is within the scope of the invention.

The pixel selector 160 produces the final de-interlaced video frame on a pixel-by-pixel basis. The pixel selector first determines if a selected pixel in the final de-interlaced video frame is present in the video field 110. If the selected pixel is present, then the pixel from the video filed 110 is used in the final de-interlaced video frame. On the other hand, if the selected pixel is not present (i.e., the selected pixel corresponds to a pixel in one of the missing lines of the video field 110), then an interpolated pixel from the pixel interpolator 150 is used in the final de-interlaced video frame. The pixel interpolator 150 produces pixels for the final de-interlaced video frame by linearly interpolating between the value of a pixel from the edge-preserving vertical interpolator 130 that corresponds to the selected pixel and the value of a pixel from the non-edge-preserving vertical interpolator 120 that corresponds to the selected pixel. The weight assigned to each pixel in the linear interpolation is based on the confidence factor received from the edge-preserving vertical interpolator 130.

The method begins in step 702, where the pixel selector 160 selects a pixel of the final de-interlaced video frame. In step 704, the pixel selector determines if the selected pixel is present in the video field 110. If the selected pixel is present in the video field 110, then in step 706, the corresponding pixel from the video field 110 is used in the de-interlaced video frame. The method then proceeds to step 714.

If, in step 704, the selected pixel is not present in the video field 110, then in step 708, the pixel selector 160 uses a pixel from the pixel interpolator 150 in the final de-interlaced video frame. In order to construct the pixel for the final de-interlaced video frame, the pixel interpolator 150, in step 710, determines the confidence factor associated with the pixel produced by the edge-preserving vertical interpolator 130 that corresponds to the selected pixel. In step 712, pixel interpolator 150 interpolates between the value of the pixel produced by the edge-preserving vertical interpolator 130 corresponding to the selected pixel (the "edge-preserved" pixel) and the value of the pixel produced by the non-edge preserving vertical interpolator 120 corresponding to the selected pixel (the "non-edge-preserved pixel"). The weights assigned in the interpolation are based on the confidence factor. In one embodiment, the interpolation performed by the pixel interpolator 150 is described by the following equation:

output pixel=(confidence factor*epp)+((1−confidence factor)*non-epp)

where "epp" is the value of the edge-preserved pixel, "non-epp" is the value of the non-edge-preserved pixel and "output pixel" is the value of the pixel produced by the pixel interpolator 150 and used in the final de-interlaced video frame by pixel selector 160. As persons skilled in the art will appreciate, when the confidence factor associated with a particular edge-preserved pixel is low, far less weight is given to that pixel in the interpolation step. In this fashion, the edge-detection technique disclosed herein discounts unclear edge directions and/or noisy video data, two phenomenon that may cause low confidence factors.

In step 714, the pixel selector 160 determines if all the pixels in the final de-interlaced video frame have been selected. If all the pixels have not been selected, then the method returns to step 702. If, on the other hand, all the pixels have been selected, then the method terminates.

One advantage of the disclosed technique is that it results in more reliable edge detection relative to prior art edge-detection techniques because the disclosed technique does not attempt to correlate pixel features to determine an edge in a video field. Rather, the disclosed technique analyzes intensity data for all of the pixels in a pixel window at once when computing the intensity gradient vector for the pixel window to determine the edge direction. Since the intensity gradient vector computations are less sensitive to noisy pixel data than pixel feature correlations, the disclosed technique is more robust in the face of noisy pixel data than prior art edge-detection techniques. In addition, the disclosed technique is further desensitized to noisy video data because the confidence factor limits the use of pixel data interpolated along the computed edge direction when the algorithm shows that the likelihood of having only one edge in the pixel window is low, which is a result that may occur with excessively noisy pixel data.

Figure 8:
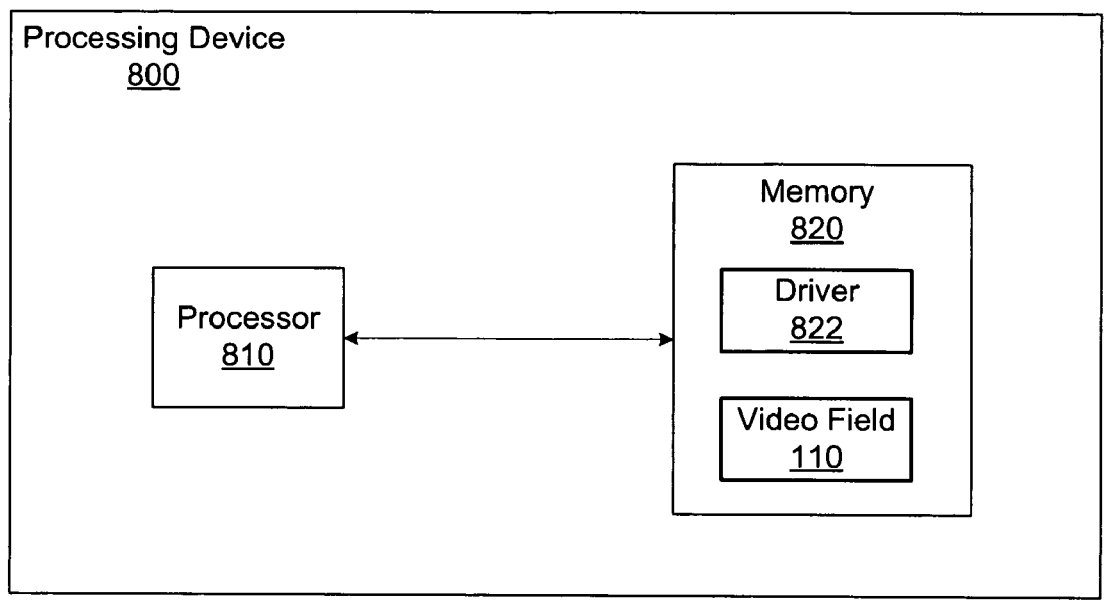
FIG. 8 is a conceptual diagram of a processing device configured to implement one or more aspects of the present invention.

FIG. 8 is a conceptual diagram of a processing device 800 configured to implement one or more aspects of the present invention. The processing device 800 includes, without limitation, a processor 810 and a memory 820. The processing device 800 may be a desktop computer, server, laptop computer, palm-sized computer, personal digital assistant, tablet computer, game console, cellular telephone, a television, a display device, such as a monitor or video projector, or any other type of similar device that processes image data. The processor 810 is coupled to the memory 820 that is used to store data such as the video field 110 and programs executed by the processor 810, such as a driver 822. The processor 810 may be any type of processing unit, such as, for example, a central processing unit, a graphics processing unit, some other type of special-purpose processing unit or a microcontroller. In one embodiment, the driver 822 implements the edge-preserving vertical interpolator 130, the non-edge-preserving vertical interpolator 120, the pixel interpolator 150 and the pixel selector 160 (not shown). In other embodiments, each of the edge-preserving vertical interpolator 130, the non-edge-preserving vertical interpolator 120, the pixel interpolator 150 and the pixel selector 160 may be implemented in hardware, such as within a graphics processing unit.

While the foregoing is directed to embodiments of the present invention, other and further embodiments of the invention may be devised without departing from the basic scope thereof. For example, in an alternative embodiment, the horizontal and vertical intensity gradients for the pixel window may be computed directly from the local horizontal and vertical gradients. The scope of the present invention is determined by the claims that follow.

I claim:

1. A method for generating pixels for a de-interlaced video frame, the method comprising:
   selecting a pixel in the de-interlaced video frame;
   determining that the selected pixel is not present in a video field;
   determining an edge direction associated with a first pixel that corresponds to the selected pixel;
   constructing the first pixel based on values of one or more pixels that reside along the edge direction;
   computing a confidence factor within a processor associated with the first pixel based on a first horizontal intensity gradient that indicates the difference in pixel intensities between two horizontally adjacent pixels located in a pixel window defined about the first pixel and a first vertical intensity gradient that indicates the difference in pixel intensities between two vertically adjacent pixels located in the pixel window, wherein the confidence factor reflects a probability that only a single edge direction is associated with the first pixel;
   performing a non-edge preserving vertical interpolation operation to generate a second pixel that corresponds to the selected pixel; and
   performing an interpolation operation between a value of the first pixel and a value of the second pixel based on the confidence factor to generate a value for the selected pixel.

2. The method of claim 1, further comprising the steps of constructing horizontal reduction factors based on the local horizontal intensity gradients and constructing vertical reduction factors based on the local vertical intensity gradients, wherein the confidence factor is computed using the horizontal reduction factors and the vertical reduction factors.

3. The method of claim 1, wherein the step of determining an edge direction comprises calculating a horizontal intensity gradient and a vertical intensity gradient for a pixel window defined about the first pixel.

4. The method of claim 3, wherein the step of determining an edge direction further comprises determining an intensity gradient vector for the pixel window based on the horizontal intensity gradient and the vertical intensity gradient, and the edge direction is defined as being perpendicular to the intensity gradient vector.

5. The method of claim 1, wherein the step of interpolating between a value of the first pixel and a value of the second pixel comprises assigning a first weight to the value of the first pixel and a second weight to the value of the first pixel based on the confidence factor.

6. A non-transitory computer-readable medium storing instructions for causing a computer to generate pixels for a de-interlaced video frame by performing the steps of:
   selecting a pixel in the de-interlaced video frame;
   determining that the selected pixel is not present in a video field;
   determining an edge direction associated with a first pixel that corresponds to the selected pixel;
   constructing the first pixel based on values of one or more pixels that reside along the edge direction; and
   computing a confidence factor associated with the first pixel computing a confidence factor associated with the first pixel based on a first horizontal intensity gradient that indicates the difference in pixel intensities between two horizontally adjacent pixels located in a pixel window defined about the first pixel and a first vertical intensity gradient that indicates the difference in pixel intensities between two vertically adjacent pixels located in the pixel window, wherein the confidence factor reflects a probability that only one edge direction is associated with the first pixel;
   performing a non-edge preserving vertical interpolation operation to generate a second pixel that corresponds to the selected pixel; and
   performing an interpolation operation between a value of the first pixel and a value of the second pixel based on the confidence factor to generate a value for the selected pixel.

7. The computer-readable medium of claim 6, further comprising the steps of constructing horizontal reduction factors based on the local horizontal intensity gradients and constructing vertical reduction factors based on the local vertical intensity gradients, wherein the confidence factor is computed using the horizontal reduction factors and the vertical reduction factors.

8. The computer-readable medium of claim 6, wherein the step of determining an edge direction comprises calculating a horizontal intensity gradient and a vertical intensity gradient for a pixel window defined about the first pixel.

9. The computer-readable medium of claim 8, wherein the step of determining an edge direction further comprises determining an intensity gradient vector for the pixel window based on the horizontal intensity gradient and the vertical intensity gradient, and the edge direction is defined as being perpendicular to the intensity gradient vector.

10. The computer-readable medium of claim 6, further comprising the step of generating a second pixel that corresponds to the selected pixel using a non-edge preserving vertical interpolation technique.

11. The computer-readable medium of claim 10, further comprising the step of blending the first pixel and the second pixel to produce a value for the selected pixel.

12. The computer-readable medium of claim 11, wherein the step of blending comprises interpolating between a value of the first pixel and a value of the second pixel, and the interpolation is based on the confidence factor.

13. The computer-readable medium of claim 6, wherein the step of interpolating between a value of the first pixel and a value of the second pixel comprises assigning a first weight to the value of the first pixel and a second weight to the value of the first pixel based on the confidence factor.

14. A computing device configured to generate pixels for a de-interlaced video frame, the computing device comprising:
   a memory;
   a processing unit; and
   a software driver storing instructions for causing the processing unit to perform the steps of:
      selecting a pixel in the de-interlaced video frame,
      determining that the selected pixel is not present in a video field,
      determining an edge direction associated with a first pixel that corresponds to the selected pixel,
      constructing the first pixel based on values of one or more pixels that reside along the edge direction,
      computing a confidence factor associated with the first pixel computing a confidence factor associated with the first pixel based on a first horizontal intensity gradient that indicates the difference in pixel intensities between two horizontally adjacent pixels located in a pixel window defined about the first pixel and a first vertical intensity gradient that indicates the difference in pixel intensities between two vertically adjacent pixels located in the pixel window, wherein the confidence factor reflects a probability that only one edge direction is associated with the first pixel,
      performing a non-edge preserving vertical interpolation operation to generate a second pixel that corresponds to the selected pixel, and
      performing an interpolation operation between a value of the first pixel and a value of the second pixel based on the confidence factor to generate a value for the selected pixel.

15. The system of claim 14, further comprising the step of generating a second pixel that corresponds to the selected pixel using a non-edge preserving vertical interpolation technique.

16. The system of claim 15, further comprising the step interpolating between a value of the first pixel and a value of the second pixel to produce a value for the selected pixel, wherein the interpolation is based on the confidence factor.

17. The computing device of claim 14, wherein the step of interpolating between a value of the first pixel and a value of the second pixel comprises assigning a first weight to the value of the first pixel and a second weight to the value of the first pixel based on the confidence factor.

* * * * *